(12) United States Patent
Fujino (10) Patent No.: US 9,106,505 B2
(45) Date of Patent: Aug. 11, 2015

(54) DIGITAL FILTER

(71) Applicant: DENSO CORPORATION, Kariya, Aichi-pref. (JP)

(72) Inventor: Takeshi Fujino, Gamagori (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/557,509

(22) Filed: Dec. 2, 2014

(65) Prior Publication Data

US 2015/0156043 A1 Jun. 4, 2015

(30) Foreign Application Priority Data

Dec. 4, 2013 (JP) ................................. 2013-251000

(51) Int. Cl.
| | | |
|---|---|---|
| *H03K 7/08* | (2006.01) | |
| *H03K 9/08* | (2006.01) | |
| *H04L 25/49* | (2006.01) | |
| *H04B 1/12* | (2006.01) | |

(52) U.S. Cl.
CPC ............. *H04L 25/4902* (2013.01); *H04B 1/12* (2013.01)

(58) Field of Classification Search
CPC .............................. H04L 25/4902; H04B 1/12
See application file for complete search history.

(56) References Cited

U.S. PATENT DOCUMENTS

| 5,162,798 | A | * | 11/1992 | Yundt ........................... 341/116 |
| 5,548,286 | A | * | 8/1996 | Craven .......................... 341/126 |
| 6,519,496 | B1 | | 2/2003 | Kawabe et al. |
| 7,142,819 | B1 | * | 11/2006 | Kang et al. .................... 455/63.3 |
| 2003/0025625 | A1 | | 2/2003 | Mizuno et al. |
| 2008/0010474 | A1 | * | 1/2008 | Chapuis ......................... 713/300 |
| 2008/0315811 | A1 | * | 12/2008 | Hudson et al. ........... 318/400.34 |

FOREIGN PATENT DOCUMENTS

| JP | H04-184173 A | 7/1992 |
| JP | 2007-139468 A | 6/2007 |

* cited by examiner

*Primary Examiner* — Erin File
(74) *Attorney, Agent, or Firm* — Posz Law Group, PLC

(57) ABSTRACT

A digital filter for removing a PWM noise from a sampling data includes: an averaging filter. The sampling data is obtained by sampling a control amount of a control object, which is driven at a driving frequency in a PWM control manner, at a sampling frequency. The PWM noise includes fundamental and harmonic wave components. The averaging filter calculates an average of the sampling data, which is sampled most recent predetermined sampling times providing an averaging number. The sampling frequency and the averaging number are determined to satisfy a relationship that an absolute value of a difference between the sampling frequency multiplied by a predetermined first integer and the harmonic wave frequency is equal to the sampling frequency divided by the averaging number and multiplied by a predetermined second integer in a frequency range between zero and a Nyquist frequency when the fundamental and harmonic wave components are removed.

5 Claims, 9 Drawing Sheets

DIGITAL FILTER

CROSS REFERENCE TO RELATED APPLICATION

This application is based on Japanese Patent Application No. 2013-251000 filed on Dec. 4, 2013, the disclosure of which is incorporated herein by reference.

TECHNICAL FIELD

The present disclosure relates to a digital filter for removing a PWM noise from a sampling data of a control object, which is operated in a PWM manner.

BACKGROUND

A control object is driven and operated by a PWM (i.e., pulse width modulation) driver so that a control amount such as a voltage or a current is controlled to be a target amount. Thus, a digital feedback control operation is performed. In this digital feedback control operation, a sampling data as a control object includes a PWM noise, which has a fundamental wave component with a PWM driving frequency and a harmonic component. In this case, the PWM noise is removed using an analog filter, which has a cut-off frequency lower than a Nyquist frequency, is arranged before an A/D converter or a sampling and holding circuit so that an aliasing in a sampling operation is restricted (JP 2003-46390 A corresponding to US 2003/0025625 A1). When the aliasing occurs, a PWM noise component, which is folded back, overlaps in a signal frequency range of the sampling data. Thus, the feedback operation becomes unstable.

However, when a response frequency of the control object is nearly equal to the PWM driving frequency, it is necessary to arrange an analog filter having a steep attenuation property with a high order. This analog filter is provided by a large circuit, and therefore, a variation of a filtering property caused by a variation of a constant value may be generated. Alternatively, the sampling frequency is increased using the A/D converter having a short conversion time, and the sampling data is input with restricting the aliasing. Further, the sampling data is processed by the digital filter so that the PWM noise is removed. However, in this case, it is necessary to prepare the A/D converter having a high conversion speed and high performance and the digital filter having the high order and the steep attenuation property with a complicated construction.

SUMMARY

It is an object of the present disclosure to provide a digital filter for removing a PWM noise without an analog pre-filter even when a sampling frequency is lower than a PWM driving frequency.

A digital filter for removing a PWM noise from a sampling data includes: an averaging filter. The sampling data is obtained by sampling a control amount of a control object at a sampling frequency. The control object is driven at a driving frequency in a PWM control manner. The PWM noise includes a fundamental wave component having the driving frequency and a harmonic wave component of the fundamental wave component having a harmonic wave frequency. The sampling data is input into the averaging filter, the averaging filter calculates an average of the sampling data, which is sampled most recent predetermined sampling times, and the averaging filter outputs the average of the sampling data. The most recent predetermined sampling times provide an averaging number. The sampling frequency and the averaging number are determined to satisfy a relationship that an absolute value of a difference between the sampling frequency multiplied by a predetermined first integer and the harmonic wave frequency is equal to the sampling frequency divided by the averaging number and multiplied by a predetermined second integer in a frequency range between zero and a Nyquist frequency when the fundamental wave component and the harmonic wave component in the PWM noise are removed from the sampling data. The predetermined first integer is equal to or larger than zero, and the predetermined second integer is equal to or larger than one.

In the above digital filter, the PWM noise is removed without arranging an analog pre-filter. Further, a circuit construction of the above digital filter is simplified compared with a conventional construction. When the PWM driving frequency and the sampling frequency are synchronized, the deviation between the PWM noise frequency and the notch frequency is prevented. Thus, the deterioration of the attenuation property caused by temperature change and chronological change is not generated.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

A first embodiment will be explained with reference to FIGS. 1 to 7B. An electric control device 10 controls digitally the current flowing through the solenoid 11 as the control object. The device 10 includes a micro-computer 12, a feedback control device 13 having an ASIC. The micro-computer 12 outputs a target current to the control device 13, the target current being to flow in the solenoid 11.

Figure 1:
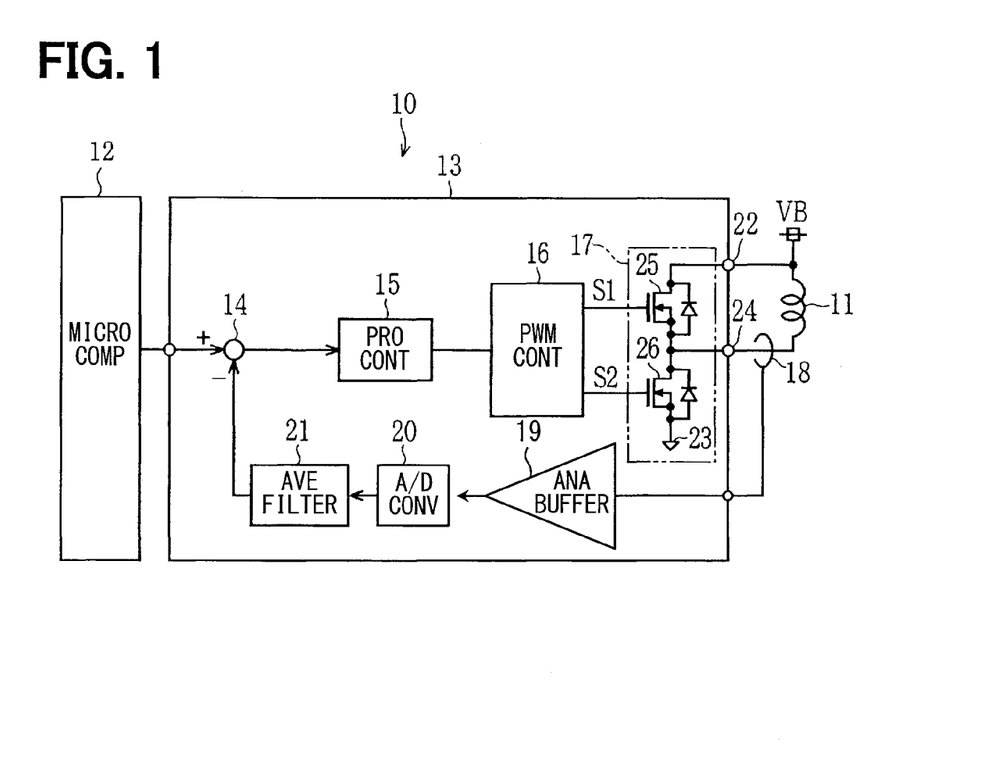
FIG. 1 is a diagram showing an electric control device according to a first embodiment.

The control device 13 includes a subtractor 14, a proportional control unit 15, a PWM control unit 16, a main circuit 17, a current sensor 18, an analog buffer 19, an A/D converter 20 and an averaging filter 21. The control device 13 other than a part of the main circuit 17, the analog buffer 19 and the A/D converter 20 is formed from digital circuits. The digital circuits function synchronously with a common clock signal.

The main circuit 17 includes N channel transistors 25, 26, which are connected in series between a power source terminal 22 and a ground terminal 23. The power source terminal 22 is connected to a positive terminal of the battery. The transistors 25, 26 sandwich an output terminal therebetween. Since the transistors 25, 26 are low side driving type transistors, the solenoid 11 is connected between the power source terminal 22 and the output terminal 24. The transistors 25, 26 turn on and off according to driving signals S1, S2, which are output from the PWM control unit 16 in a complementary manner.

When the transistor 26 turns on, and the transistor 25 turns off, the current flowing through the solenoid 11 is increased using the main circuit 17. When the transistor 26 turns off, and the transistor 25 turns on, the current flowing through the solenoid 11 flows back via the transistor 25 with a low loss (i.e., synchronous rectification operation is performed). As a result, the current corresponding to a duty ratio of the driving signal S2 flows through the solenoid 11.

The current sensor 18 is arranged in an energization passage to the solenoid 11, and the sensor 18 is a detecting device for detecting the current as a control amount. For example, the current sensor 18 includes a Hall element. The analog buffer 19 converts the output signal from the current sensor 18 to a detection signal having a predetermined voltage range, which is suitable for the A/D converting operation. The A/D converter 20 includes a sampling and holding circuit, so that the converter 20 samples the detection signal at a sampling frequency fs, and then, converts the detection signal in an A/D converting manner. Thus, the converter 20 obtains the sampling data as the detection current.

Figure 2:
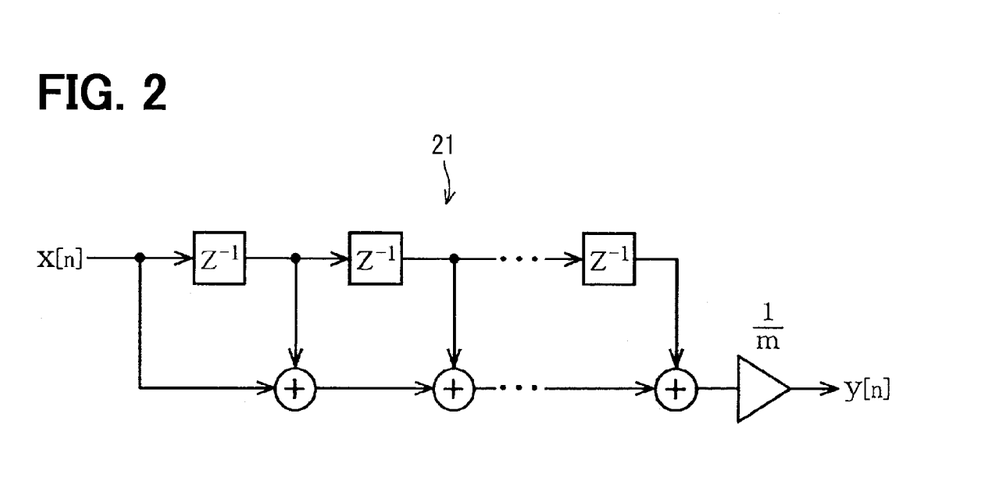
FIG. 2 is a diagram showing an averaging filter.

The averaging filter 21 includes a conventional moving average filter shown in FIG. 2. The filter 21 inputs the sampling data, and calculates the average of the sampling data based on the obtained data from the latest sampling data to the Mth latest sampling data. Thus, the filter 21 outputs the average. Here, the index of M is an integer equal to or larger than two. Here, the most recent obtained data includes the data sampled most recently to the data sampled at the Mth time before the present time. The averaging filter 21 has a digital filtering function for removing the PWM noise selectively from the sampling data in addition to a low pass filtering function as an essential function.

The subtractor 14 calculates a current deviation by subtracting the detection current, from which the PWM noise is removed, from the target current obtained from the microcomputer 12. The proportional control unit 15 calculates the comparison operating amount by multiplying the current deviation by the proportional gain. The PWM control unit 16 generates the driving signal S2 having the duty ratio corresponding to the proportional operating amount and the driving signal S1 as a reverse signal. Based on the driving signals S1, S2, the control unit 16 drives and operates the transistors 25, 26 in a PWM operation manner. Thus, the solenoid 11 is driven in the PWM operation manner.

Next, a function of the present embodiment will be explained with reference to FIGS. 3 to 7. When the PWM control unit 16 controls the transistors 25, 26 at the driving frequency fd1 in the PWM driving control manner, the PWM noise including the fundamental wave component having the driving frequency fd1 and the harmonic component of the fundamental wave component is superimposed on the output signal of the current sensor 18. When the driving frequency fd1 is 5 kHz, the waveform of the current flowing through the solenoid 11 repeats to increase and decrease at every 200 micro-seconds (µs), which is the PWM period, as shown in FIG. 3.

Figure 3:
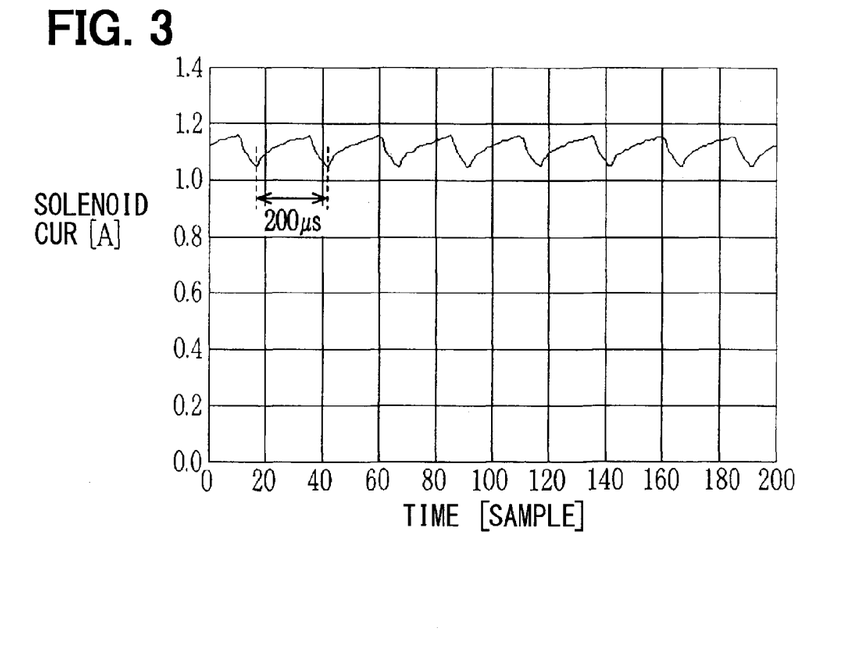
FIG. 3 is a graph showing a waveform of a solenoid current.
Figure 4:
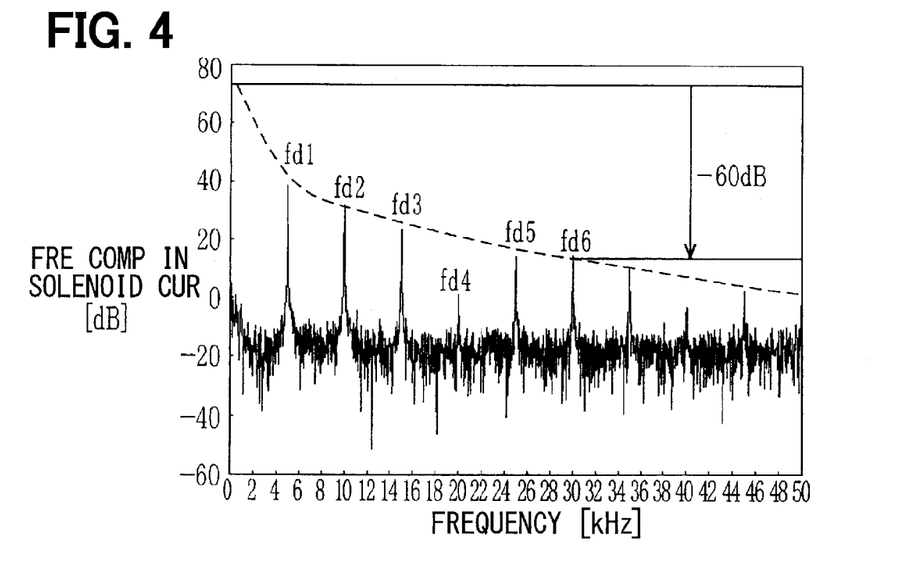
FIG. 4 is a diagram showing a frequency spectrum of the solenoid current in FIG. 3.

FIG. 4 shows the frequency spectrum of the waveform of the current in FIG. 3. The PWM noise includes a frequency component indicative of "fdn=n×fd1." Here, the index of n is a natural number (i.e., n=1, 2, 3, ... ). The higher the order of the harmonic component, the smaller the strength, shown as a broken line in FIG. 4. In an example in FIG. 4, the strength (i.e., the intensity) of the sixth order harmonic wave fd6 at the frequency of 30 kHz is smaller than the average (i.e., a DC level) by −60 dB. Here, the magnitude of −60 dB corresponds to one LSB (i.e., 1 least significant bit) of the 10-bit A/D converter. Accordingly, when the 9-bit or less A/D converter 20 is used, it is sufficient to remove the PWM noise from the fundamental wave fd1 to the sixth order harmonic wave fd6.

The control device 13 does not include a pre-filter for preventing an aliasing. Accordingly, the PWM noise component is generated in a range between the frequency of zero of the sampling data sampled at the frequency fs and the Nyquist frequency of fs/2. Specifically, the PWM noise component is generated at a certain frequency indicative of the absolute value of the difference between the frequency of "le fs" and the noise frequency fdn. Here, the frequency of "k·fs" is obtained by multiplying the sampling frequency fs by the index of k. The index k is an integer equal to or larger than zero (i.e., K=0, 1, 2, ... ). The absolute value of the difference is indicative of "|k·fs−fdn·."

When the index of k is zero, the frequency, at which the noise is generated, is the frequency fdn of the PWM noise component. When the index of k is not equal to zero, the frequency, at which the noise is generated, is provided by folding the frequency fdn of the PWM noise component, which is caused by the aliasing. In order to avoid the aliasing with respect to the response frequency of the current flowing through the solenoid 11, it is necessary to set the sampling frequency fs to be twice or more higher than the response frequency.

The averaging filter 21 has a notch property in addition to the low pass filtering function for providing the averaging operation, so that the attenuation amount increases at the frequency calculated by multiplying the value of fs/m with the natural number. Here, when the frequency is calculated by multiplying the value of fs/m with zero so that the frequency is zero, i.e., in case of the direct current (i.e., DC), the notch attenuation is not generated. Thus, the frequency, at which the attenuation amount increases, does not include the frequency calculated by multiplying the value of fs/m with zero. When the notch frequency coincides with the frequency of the PWM noise, which is generated at a range between the frequency of zero and the frequency of fs/2 of the sampling data, only the PWM noise is selectively attenuated without affecting the response frequency of the detection current.

When the driving frequency is 5 kHz, the sampling frequency of fs is 11 kHz, and the averaging number m is 11, the absolute value of the difference between the frequency of "k×fs" and the noise frequency of fdn is equal to the frequency obtained by multiplying the value of fs/m with the integer in the frequency range between zero and the Nyquist frequency of fs/2. FIGS. 5A to 5D show a frequency property of the detection signal before sampling, the sampling data of the A/D converter 20, the averaging filter 21, and the output data of the averaging filter 21, respectively.

Figure 5A:
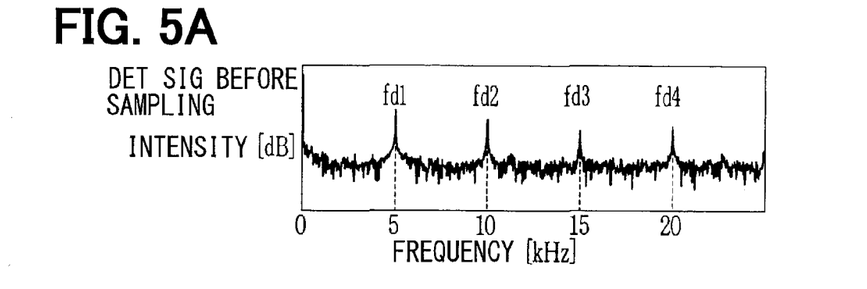
FIGS. 5A to 5D are diagrams showing a frequency property when a frequency of a PWM noise component coincides with a notch frequency.
Figure 5B:
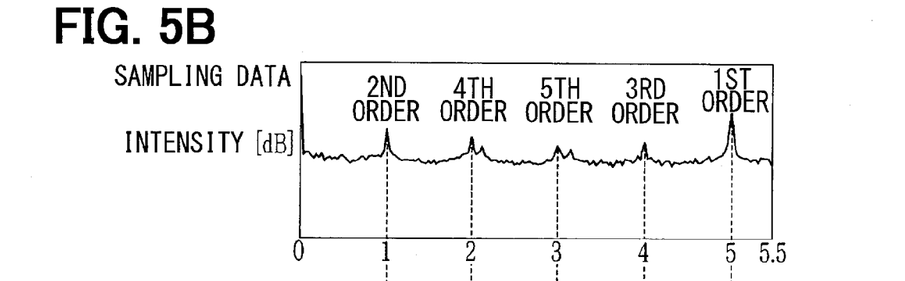
Figure 5C:
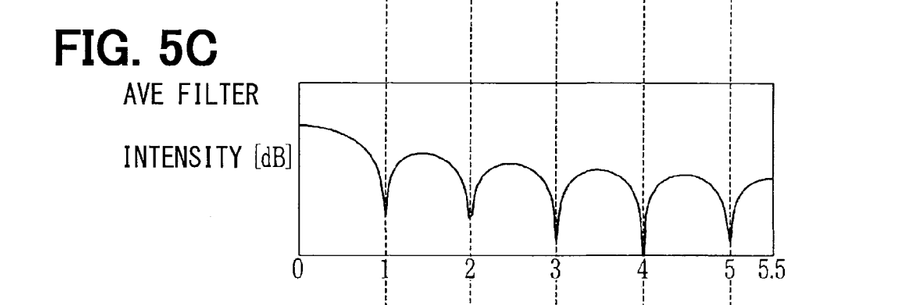

In the sampling data shown in FIG. 5B, the primary fundamental wave of the PWM noise at the frequency of 5 kHz (i.e., the index of k is zero), the folded second order harmonic wave at the frequency of 1 kHz (i.e., the index of k is one), the folded third order harmonic wave at the frequency of 4 kHz (i.e., the index of k is one), the folded fourth order harmonic wave at the frequency of 2 kHz (i.e., the index of k is two), the folded fifth order harmonic wave at the frequency of 3 kHz (i.e., the index of k is two), and the like are generated in the frequency range between zero and fs/2. The averaging filter 21 has the notch frequencies of 1 kHz, 2 kHz, 3 kHz, 4 kHz, and 5 kHz, which are prepared at each predetermined frequency of "fs/m=11 kHz/11=1 kHz," as shown in FIG. 5C.

Figure 5D:
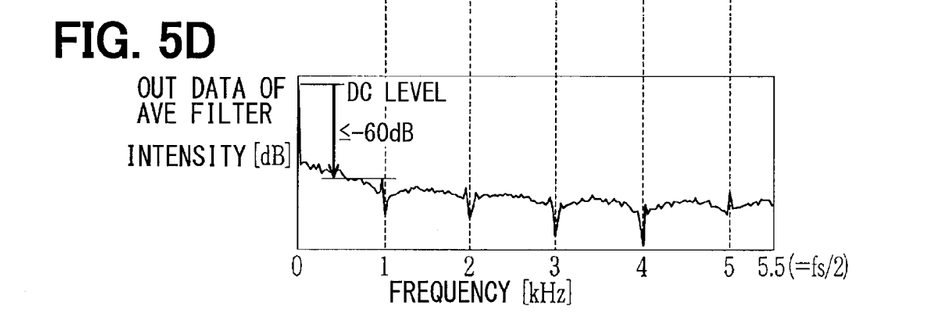

As a result, as shown in FIG. 5D, the PWM noise is removed from the sampling data output from the averaging filter 21, so that the PWM noise remained in the frequency range between zero and fs/2 is attenuated to be equal to or lower than −60 dB with respect to the average value (i.e., the DC level). The eleventh order harmonic wave and the twenty-second order harmonic wave in the PWM noise components are folded to the DC component (i.e., direct current component). Further, since the number of order to the harmonic wave is very high, the intensity of the high order harmonic wave is sufficiently small, compared with the 1 LSB of the A/D converter 20.

To compare with the above case, for example, assuming that the sampling frequency fs is 7.7 kHz, and the averaging number m is six, the above relationship is not satisfied. The frequency properties in this case, will be shown in FIGS. 6A to 6D. The PWM noise in the detection signal before sampling is the same as in FIG. 5A. In the sampling data shown in FIG. 6B, the folded fundamental wave of the PWM noise at the frequency of 2.7 kHz (i.e., the index of k is one), the folded second order harmonic wave at the frequency of 2.3 kHz (i.e., the index of k is one), the folded third order harmonic wave at the frequency of 0.4 kHz (i.e., the index of k is two), the folded fourth order harmonic wave at the frequency of 3.0 kHz (i.e., the index of k is three), the folded fifth order harmonic wave at the frequency of 1.9 kHz (i.e., the index of k is three), the folded sixth order harmonic wave at the frequency of 0.8 kHz (i.e., the index of k is four), and the like are generated in the frequency range between zero and fs/2.

Figure 6A:
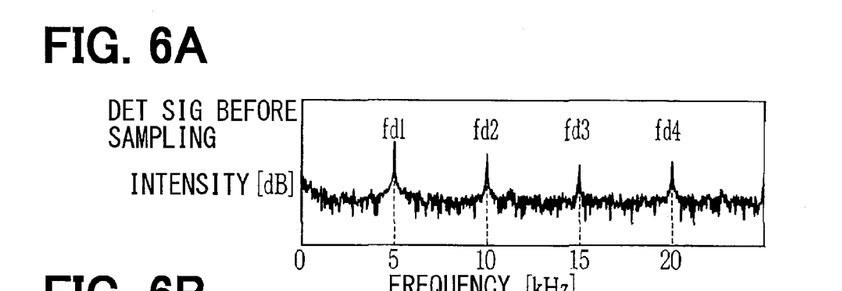
FIGS. 6A to 6D are diagrams showing a frequency property when a frequency of a PWM noise component does not coincide with a notch frequency.
Figure 6B:
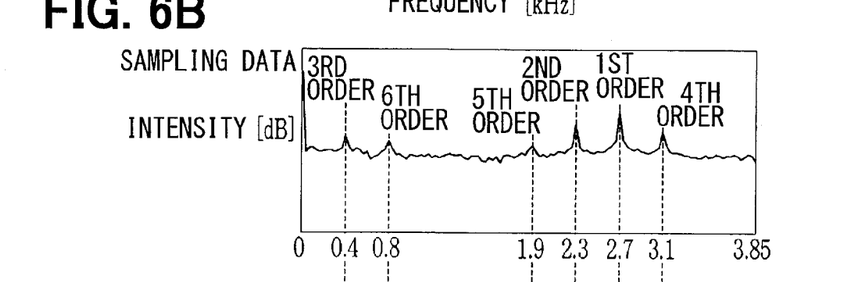
Figure 6C:
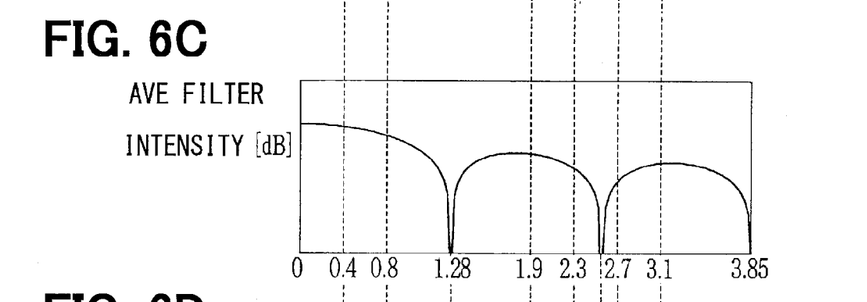
Figure 6D:
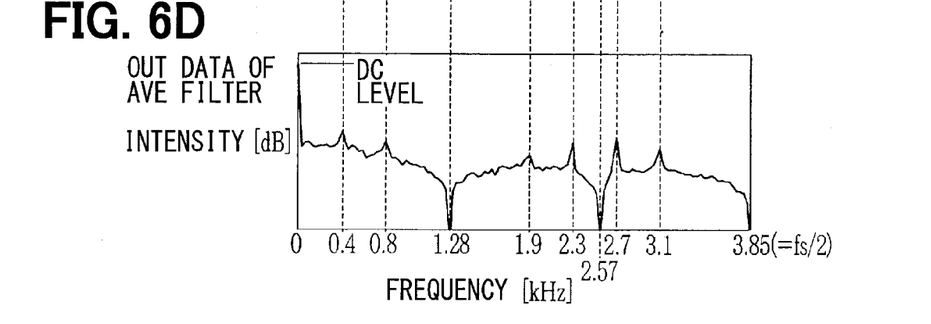

As shown in FIG. 6C, in the above case, the averaging filter 21 has the notch frequencies, which are prepared at each predetermined frequency of "fs/m=7.7 kHz/6=1.28 kHz." As a result, as shown in FIG. 6D, the frequency of the PWM noise does not coincide with the notch frequency, so that the PWM noise is not removed sufficiently from the sampling data.

Figure 7A:
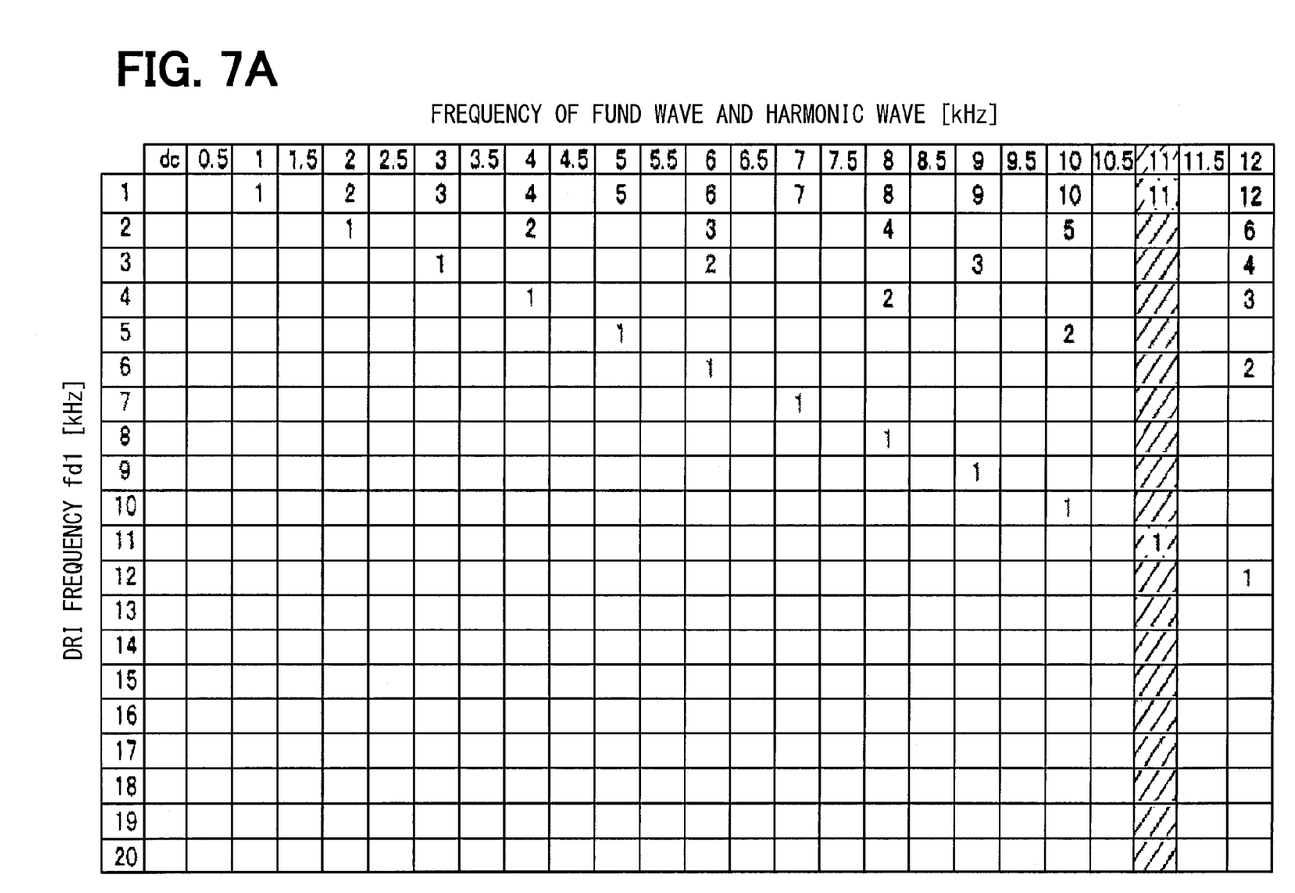
FIGS. 7A to 7D are diagrams showing a relationship between a driving frequency fd1 and a frequency of a harmonic wave fdn.
Figure 7B:
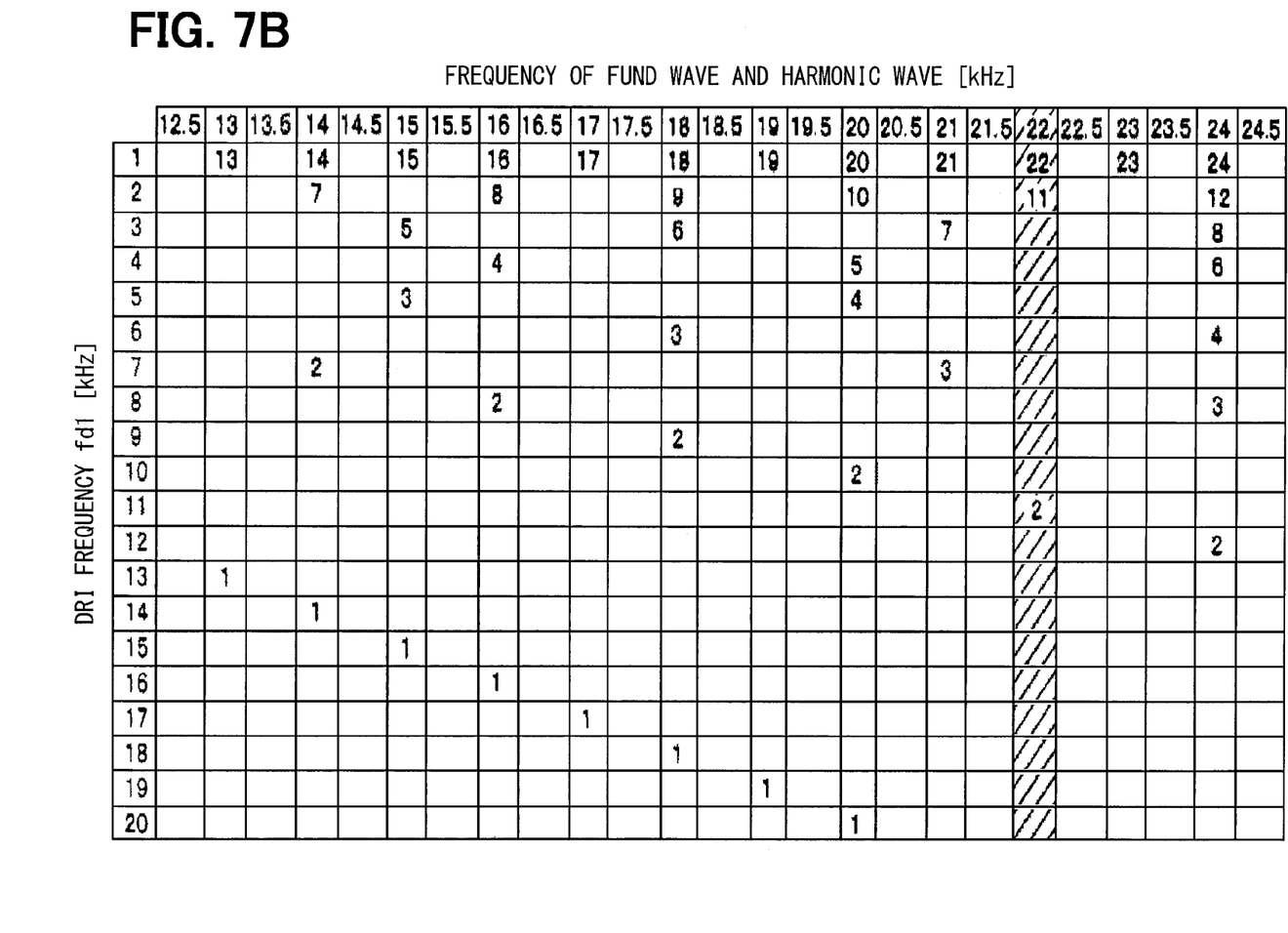
Figure 7C:
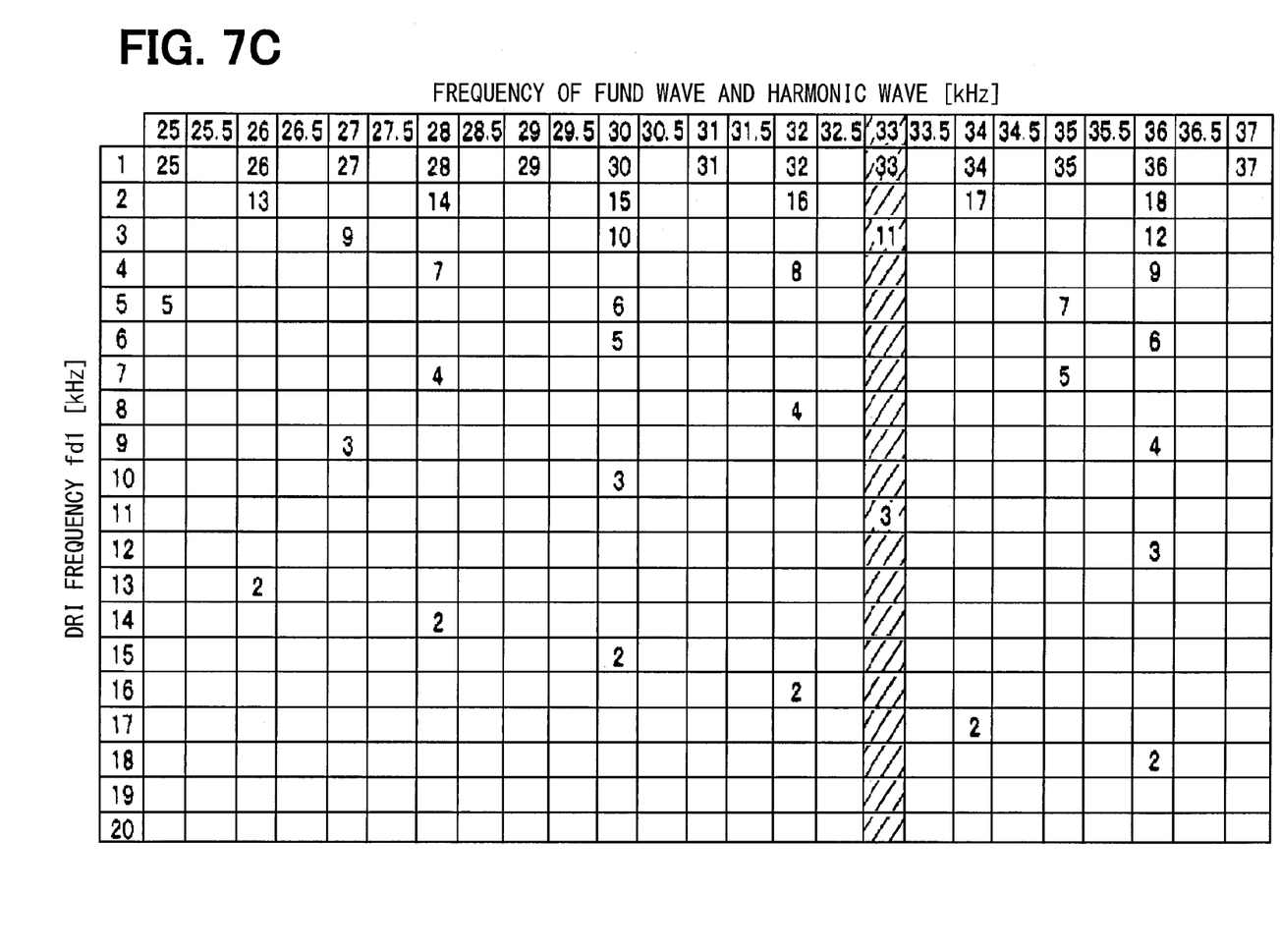
Figure 7D:
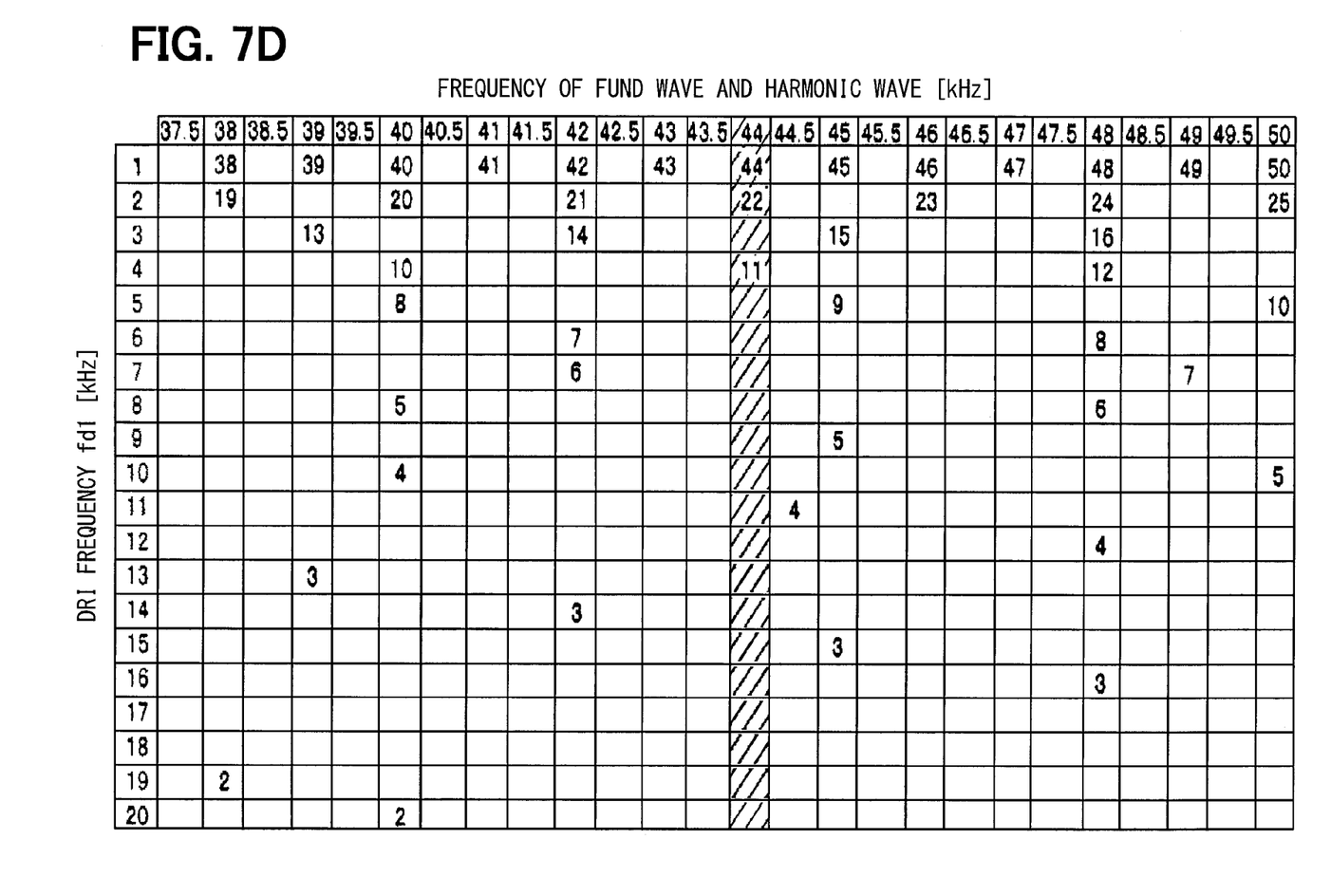

The diagrams in FIGS. 7A to 7D show the relationship between the driving frequency fd1 and the frequency of the harmonic wave of fdn. Specifically, the table in FIG. 7B is a continuation of the table in FIG. 7B, and the table in FIG. 7D is a continuation of the table in FIG. 7C. Each row represents the frequencies of the fundamental wave and the harmonic waves when the driving frequency is fd1, which is set at intervals of 1 kHz in the range between 1 kHz and 20 kHz. Each column represents the frequencies having the interval of 0.5 kHz. The hatched column in FIGS. 7A to 7D represents the frequency obtained by multiplying the sampling frequency with the integer (i.e., 11 kHz, 22 kHz, 33 kHz, . . . ). The number in the tables represents the number of orders.

When the sampling frequency of the averaging filter 21 is 11 kHz, and the averaging number m is 11, the notch frequencies of 1 kHz, 2 kHz, . . . , 10 kHz, 12 kHz, 13 kHz, . . . , 21 kHz, 23 kHz, 24 kHz, . . . , 32 kHz, . . . and the like, and the frequencies calculated by multiplying the sampling frequency fs with the integer, i.e., 11 kHz, 22 kHz, 33 kHz, . . . and the like are aligned at every 1 kHz. Accordingly, each of the driving frequency fd1 and the harmonic wave frequencies fdn coincides with one of the notch frequencies and the frequencies calculated by multiplying the sampling frequency fs with the integer.

The PWM noise component coinciding with the notch frequency is attenuated by the averaging filter 21. The component coinciding with the frequency calculated by multiplying the driving frequency fd1 with the integer is not affected by the attenuation function of the notch since the component is folded to the DC component (i.e., the direct current component). When the driving frequency fd1 for executing the PWM driving operation is not 11 kHz, the PWM noise component other than the high order harmonic wave component such as the 11th order harmonic wave component, the 22th order harmonic wave component, and the 33th order harmonic wave component is attenuated.

As described above, the averaging filter 21 according to the present embodiment has a relationship such that the absolute value of "|k·fs−fdn|" with respect to the PWM noise frequency fdn and the sampling frequency fs is equal to the frequency calculated by multiplying the value of fs/m with the integer other than zero in the frequency range between zero and the value of fs/2. Since the frequency of the PWM noise coincides with the notch frequency of the averaging filter 21 according to the relationship, the PWM noise is removed without arranging the analog pre-filter. As long as the above relationship is satisfied, the PWM noise is removed using the sampling frequency fs lower than the driving frequency fd1. Thus, when the A/D converter 20 has the comparatively ling conversion time, or when the number of channels is increased, and the sampling rate is reduced, the above constitution effectively functions.

The PWM driving frequency fd1 and the sampling frequency fs are synchronously with the common clock signal. Thus, even if an external condition is changed, i.e., even if temperature is changed, the frequency fdn of the PWM noise component does not deviate from the notch frequency, i.e., the frequency fdn of the PWM noise component always coincides with the notch frequency. Further, the deterioration of the attenuation property caused by the variation of a constant value and chronological change, which arises in an analog filter, does not occur. Using the digital filter, a circuit construction is much simplified compared with a conventional construction using the analog pre-filter.

The averaging number may be one of 5, 7, 11, 13 and 17. When the averaging number m is a prime number, the above relationship is easily maintained so that the harmonic wave is attenuated. Further, a range of the PWM noise frequency applicable to the averaging filter 21 expands. In this case, the lower limit of the averaging number m is determined by the order number of the harmonic wave, at which the relationship of the DC (direct current) is satisfied. In the present embodiment, the lower limit of the averaging number m is determined by the order number of eleventh. The upper limit of the averaging number m is determined by the response speed of a control system.

Second Embodiment

A second embodiment will be explained with reference to FIG. 8. The averaging filter may be different from the construction shown in FIG. 2 as long as the sampling data is input, and the average of the most recent M times sampling data is calculated and output. For example, M items of the sampling data output from the A/D converter are accumulated, the data is calculated by dividing the accumulated value by m just after the accumulating operation of M items is executed, and the divided data is output.

The above filter resamples the sampling data output from the averaging filter 21 in FIG. 1 at the sampling frequency of fs/m. The PWM noise is removed from the resampled data. Since the resampling operation narrows the band frequency. Thus, it is necessary to set the sampling frequency fs/m to be twice or more higher than the response frequency in order to prevent the generation of the aliasing with respect to the response frequency of current.

Figure 8:
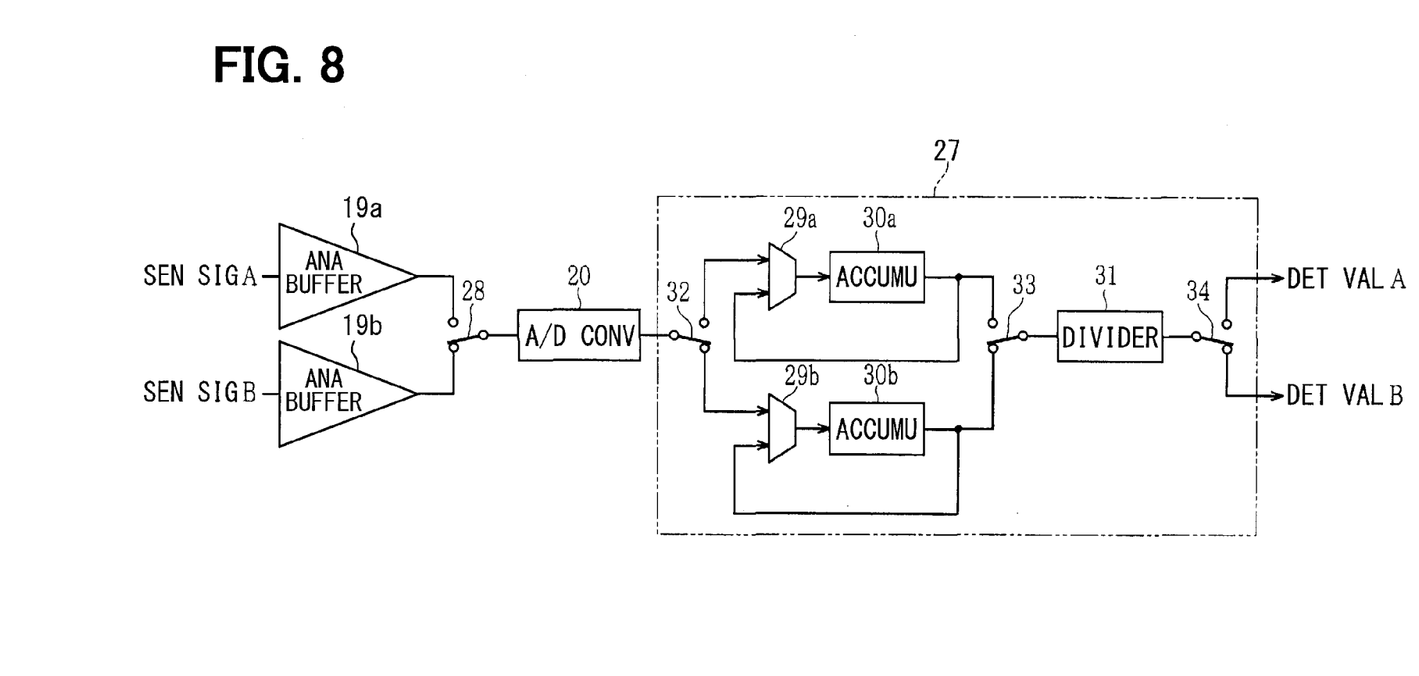
FIG. 8 is a diagram showing a noise removing circuit having an averaging filter according to a second embodiment.

FIG. 8 shows a circuit for removing the PWM noise from the sampling data of two sensors using the averaging filter 27, which provides the accumulating operation. An analog buffer 19a, 19b is arranged to each of two sensors. When the switch 28 alternately switches, the A/D converter 20, which is commonly arranged to the analog buffers 19a, 19b, converts the detection signal output from the analog buffer 19a, 19b with an analog conversion operation.

The averaging filter 27 includes two selectors 29a, 29b, two accumulators 30a, 30b, a common divider 31, and three switches 32-34. The switching operation of switches 32-34 is the same as the switching operation of the switch 28, so that the switching side of the switches 32-34 is the same as the switch 28. When the sampling data is input via the switch 32, the selector 29a selects the input data, and outputs the selected data to the accumulator 30a. The accumulator 30a accumulates the sampling data, which is input.

The selector 29a selects the data of the accumulator 30a while the sampling data is not input. The accumulator 30a holds the accumulated value. The selector 29b and the accumulator 30b also function similar to the selector 29a and the accumulator 30a. The divider 31 divides the accumulated value with m when the accumulated value calculated by accumulating m items of the sampling data is input via the switch 33. The divider 31 outputs the divided value as the detection value via the switch 34.

The averaging filter 27 has the notch property similar to the first embodiment. Accordingly, when the frequency fdn of the PWM noise component, the sampling frequency fs and the averaging number m have the relationship described in the first embodiment, the effects similar to the first embodiment are obtained. The averaging filter 27 includes one register for accumulation at each sensor (i.e., each channel). Further, the divider 31 is commonly used for each channel. Thus, the layout area of the filter 27 with respect to the same channel number is smaller than the averaging filter 21 in FIG. 1.

Other Embodiments

In the second embodiment, a circuit for removing the PWM noise using the averaging filter 27 may handle the sampling data output from three or more sensors.

The control object for the PWM driving operation may be other devices in addition to the solenoid 11. For example, the control object may be a reactor for providing a chopper circuit. The main circuit for driving the control object in the PWM control manner may be other circuits in addition to the main circuit 17. For example, the transistor 25 in the main circuit 17 may be replaced to a diode.

Here, the solenoid 11 corresponds to the control object, and the averaging filter 21, 27 corresponds to the digital filter or the moving average filter.

The above disclosure has the following aspects.

A digital filter for removing a PWM noise from a sampling data includes: an averaging filter. The sampling data is obtained by sampling a control amount of a control object at a sampling frequency. The control object is driven at a driving frequency in a PWM control manner. The PWM noise includes a fundamental wave component having the driving frequency and a harmonic wave component of the fundamental wave component having a harmonic wave frequency. The sampling data is input into the averaging filter, the averaging filter calculates an average of the sampling data, which is sampled most recent predetermined sampling times, and the averaging filter outputs the average of the sampling data. The most recent predetermined sampling times provide an averaging number. The sampling frequency and the averaging number are determined to satisfy a relationship that an absolute value of a difference between the sampling frequency multiplied by a predetermined first integer and the harmonic wave frequency is equal to the sampling frequency divided by the averaging number and multiplied by a predetermined second integer in a frequency range between zero and a Nyquist frequency when the fundamental wave component and the harmonic wave component in the PWM noise are removed from the sampling data. The predetermined first integer is equal to or larger than zero, and the predetermined second integer is equal to or larger than one.

The frequency equal to the absolute value of the difference between the sampling frequency multiplied by the predetermined first integer and the harmonic wave frequency in the frequency range between zero and the Nyquist frequency is the harmonic wave frequency (i.e., the first integer is zero) or a folded harmonic wave frequency (i.e., the first integer is not zero). The averaging filter has a notch property such that the attenuation amount increases largely at the sampling frequency divided by the averaging number and multiplied by the predetermined second integer. Accordingly, when the relationship is satisfied, the fundamental wave component, the harmonic wave component and folded frequency components of them in the PWM noise are overlapped on the notch frequency so that fundamental wave component, the harmonic wave component and the folded frequency components are attenuated. Since the averaging filter does not provide an attenuation effect on the direct current component (i.e., a DC component or the sampling frequency divided by the averaging number and multiplied by zero). Thus, the above relationship does not include a case where the second integer is zero.

In the above digital filter, the PWM noise is removed without arranging an analog pre-filter. Further, as long as the relationship is satisfied, the PWM noise is removed using the sampling frequency lower than the PWM driving frequency. Thus, when the A/D converter has a comparative long conversion time, or when the number of channels increases so that the sampling rate is reduced, the above digital filter provides excellent advantages. The digital filter includes the averaging filter having a simple digital circuit instead of an analog pre-filter having a rapid attenuation property, a high speed A/D converter, or a complicated digital filter having a rapid attenuation property. Thus, a circuit construction of the above digital filter is simplified compared with a conventional construction. When the PWM driving frequency and the sampling frequency are synchronized, the deviation between the PWM noise frequency and the notch frequency is prevented. Thus, the deterioration of the attenuation property caused by temperature change and chronological change is not generated.

Alternatively, the averaging filter may be a moving average filter. Alternatively, the averaging filter may accumulate the sampling data until the number of sampling data is equal to the averaging number, and the averaging filter divides an accumulated sampling data by the averaging number, and outputs a divided sampling data every time when the averaging filter completes to accumulate the sampling data. In these cases, a memory area for storing data temporally is reduced.

Alternatively, the averaging number may be one of 5, 7, 11, 13 and 17. In this case, when the averaging number is prime number, the harmonic wave is attenuated with maintaining the above relationship. Thus, the PWM noise frequency, to which the above digital filter is applicable, is expanded. In this case, the lower limit of the averaging number is determined by the order of the harmonic wave, which satisfies the relationship of the direct current. The upper limit of the averaging number is determined by the response speed of a control system.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A digital filter for removing a PWM (pulse width modulation) noise from a sampling data comprising:
   an averaging filter,
   wherein the sampling data is obtained by sampling control amounts driving an electrical device at a sampling frequency,
   wherein the control object is driven at a driving frequency in a pulse width modulation (PWM) control method,
   wherein the PWM noise includes a fundamental wave component having the driving frequency and a harmonic wave component of the fundamental wave component having a harmonic wave frequency,
   wherein the sampling data is input into the averaging filter over a predetermined sampling time period, the averaging filter calculates an average of the sampling data over the predetermined sampling time period, and the averaging filter outputs an averaging number of the sampling data for the predetermined sampling time period,
   wherein the sampling frequency and the averaging number are determined to satisfy a relationship that an absolute value of a difference between the sampling frequency multiplied by a predetermined first integer and the harmonic wave frequency is equal to the sampling frequency divided by the averaging number and multiplied by a predetermined second integer in a frequency range between zero and a Nyquist frequency when the fundamental wave component and the harmonic wave component in the PWM noise are removed from the sampling data, and
   wherein the predetermined first integer is equal to or larger than zero, and the predetermined second integer is equal to or larger than one.

2. The digital filter according to claim 1, wherein the averaging filter is a moving average filter.

3. The digital filter according to claim 1,
   wherein the averaging filter accumulates the sampling data until the number of sampling data is equal to the averaging number, and
   the averaging filter divides an accumulated sampling data by the averaging number, and outputs a divided sampling data every time when the averaging filter completes to accumulate the sampling data.

4. The digital filter according to claim 1, wherein the averaging number is one of 5, 7, 11, 13 and 17.

5. The digital filter according to claim 1, wherein
   the Nyquist frequency is equal to the sampling frequency divided by two, and
   the harmonic wave frequency is equal to the driving frequency multiplied by a natural number.

* * * * *